(12) United States Patent
Crescenzi (10) Patent No.: US 7,832,329 B2
(45) Date of Patent: Nov. 16, 2010

(54) MOKA COFFEE MACHINE AND METHOD FOR PREPARING A COFFEE-FLAVOURED DRINK

(76) Inventor: Massimo Crescenzi, Via Cavoni snc, Frosinone (IT) I-03100

( * ) Notice: Subject to any disclaimer, the term of this patent is extended or adjusted under 35 U.S.C. 154(b) by 245 days.

(21) Appl. No.: 11/921,661

(22) PCT Filed: Jun. 8, 2005

(86) PCT No.: PCT/IT2005/000321

§ 371 (c)(1),
(2), (4) Date: Dec. 6, 2007

(87) PCT Pub. No.: WO2006/131939

PCT Pub. Date: Dec. 14, 2006

(65) Prior Publication Data

US 2009/0117240 A1 May 7, 2009

(51) Int. Cl.
*A47J 31/44* (2006.01)
*A47J 31/00* (2006.01)
(52) U.S. Cl. ............... 99/303; 99/285; 99/323.1
(58) Field of Classification Search .......... 99/282, 99/281, 283, 285, 303, 323.1, 302 R
See application file for complete search history.

(56) References Cited

U.S. PATENT DOCUMENTS

| | | | | |
|---|---|---|---|---|
| 2,220,146 A * | 11/1940 | Curry | ............... | 220/583 |
| 3,077,156 A * | 2/1963 | Egi et al. | ............... | 99/285 |
| 3,111,079 A * | 11/1963 | Lescure | ............... | 99/293 |
| 3,518,933 A * | 7/1970 | Weber | ............... | 99/283 |
| 4,143,589 A * | 3/1979 | Weber | ............... | 99/282 |
| 4,516,484 A | 5/1985 | De Ponti et al. | | |
| 4,555,371 A * | 11/1985 | Jeans | ............... | 261/122.1 |
| 5,337,652 A * | 8/1994 | Fischer et al. | ............... | 99/282 |
| 5,970,850 A | 10/1999 | Piazza et al. | | |
| 6,142,063 A * | 11/2000 | Beaulieu et al. | ............... | 99/283 |
| 6,202,540 B1 * | 3/2001 | Johnson et al. | ............... | 99/285 |
| 6,324,963 B1 * | 12/2001 | Cirasole | ............... | 99/285 |
| 7,644,649 B2 * | 1/2010 | Dworzak et al. | ............... | 99/279 |
| 2005/0109213 A1 | 5/2005 | Terada | | |

FOREIGN PATENT DOCUMENTS

| | | |
|---|---|---|
| DE | 203 18 806 | 4/2004 |
| EP | 0 607 765 | 7/1994 |
| EP | 0 838 186 | 4/1998 |

* cited by examiner

*Primary Examiner*—Reginald L Alexander
(74) *Attorney, Agent, or Firm*—Nixon & Vanderhye P.C.

(57) ABSTRACT

The invention refers to a moka coffee machine, basically traditional, modified in order to obtain an expresso coffee without altering the organoleptic properties thereof. The machine according to the invention allows to control the temperature of the water inside the boiler, and to prepare the drink without having the water reaching exceedingly high pressures.

25 Claims, 6 Drawing Sheets

MOKA COFFEE MACHINE AND METHOD FOR PREPARING A COFFEE-FLAVOURED DRINK

This application is the U.S. national phase of International Application No. PCT/IT2005/000321 filed 8 Jun. 2005 which designated the U.S.

BACKGROUND OF THE INVENTION

The present invention refers to a coffee machine, and in particular to a coffee maker of the kind commonly designated by the term "moka", and to an improved method for preparing a coffee-flavoured drink.

Moka coffee makers are mainly made of alloys of steel, aluminium or ceramics and provide some indisputable advantages, such as their simplicity of use and maintenance and their low purchase price.

However, it is well-known that the coffee prepared with such coffee makers is of lower quality with respect to the one that can be had at a bar.

The principles exploited for preparing expresso coffee are basically different from those exploited in moka coffee makers; this is basically the reason for the differences in quality, and above all in taste.

In coffee prepared at home in a moka coffee maker, the water in the boiler reaches high temperatures (greater than 100° C.) due to the pressure that is generated in the latter and then contributes to allow water to rise and flow through the coffee-containing filter up to the top container collecting the prepared drink.

However, the above-described method, above all owing to the high temperatures of the water coming into contact with the coffee powder, sensibly alters the organoleptic properties of the coffee itself, burning most of the fatty component, the one giving "body" to the drink and producing the well-known aroma.

Therefore, the resulting coffee generally is a very fluid drink, of low thickness and body and scarcely aromatic. Proof of the above is the fact that the coffee thus prepared is never accompanied by a high quantity of "cream", significant of the preservation of such fatty components.

Moreover, the temperature reached by the water during the preparing is also excessive for an immediate consumption, forcing the user to wait for the coffee to cool down to an acceptable temperature.

The alternative to such a preparing is just that of an expresso coffee prepared as at a bar.

In fact, to obtain a high-quality coffee these professional machines must adopt a set of technical contrivances allowing a very accurate control of all the parameters coming into play, from temperature to water pressure.

At coffee bars, the famed expresso coffee (an Italian source of worldwide pride) is obtained by using professional machines, which however are very sophisticated and expensive, in the operation as well as the maintenance thereof.

A household alternative to professional machines for coffee bar use is represented by small expresso coffee machines, which on principle should work similarly to the former and therefore prepare an alike coffee.

However, it has to be pointed out that while a professional machine used at a coffee bar is controlled at all times, used with the right coffee and its maintenance and cleaning is regularly carried out, often household machines are improperly used, the coffee used is not always the right one, the water used is nearly always rich in calcareous deposits, thereby deteriorating over extremely short times. On the other hand, those are machines belonging to a sophisticated typology, adapted to household operation by often coming to compromises between costs and quality.

SUMMARY OF THE INVENTION

The technical problem underlying the present invention is to provide a moka coffee maker, to be commonly used at home without any specific care, overcoming the drawbacks mentioned hereto with reference to the known art.

Such a problem is solved by a coffee machine as described.

Moreover, a further object of the present invention is to provide a method for preparing a coffee-flavoured drink.

The present invention, by overcoming the mentioned known-art problems, entails several evident advantages.

The main advantage lies in obtaining a rich and tasty coffee, alike and even better than that of a coffee bar, in an extremely simple manner, at home, by means of a coffee maker basically identical to that commonly found in households.

This, in order to obtain an ever-improved coffee, entails an evident advantage in economic terms. In fact, suffice it to remember that the moka coffee maker is surely the one with a lower unitary cost per coffee, whereas all other solutions proposed, from the most professional ones to the ones imitating them at household level, entail markedly higher unitary costs.

Moreover, the purchase prices of a coffee maker according to the present invention will be almost the same of today, and the costs of assistance will be next to zero, as the latter does not necessarily envisage the use of specific electric or mechanical tools.

BRIEF DESCRIPTION OF THE DRAWINGS

Other advantages, features and the operation modes of the present invention will be made apparent in the following detailed description of some embodiments thereof, given by way of a non-limiting example. Reference will be made to the figures of the annexed drawings, wherein:

FIGS. 1A-1 is a detailed view of a quick connector;

FIG. 1B is an exploded view showing a variant of coffee maker with a dispensing spout;

DETAILED DESCRIPTION OF THE INVENTION

The present invention is based on the observation of the fact that, in order to obtain an expresso coffee exhibiting the correct organoleptic qualities, the right body proper to expresso coffee and a good aroma, some parameters of the method for preparing the drink are of fundamental importance; in particular, the temperature and the pressure of the water transiting the coffee powder in the filter.

Figure 1A:
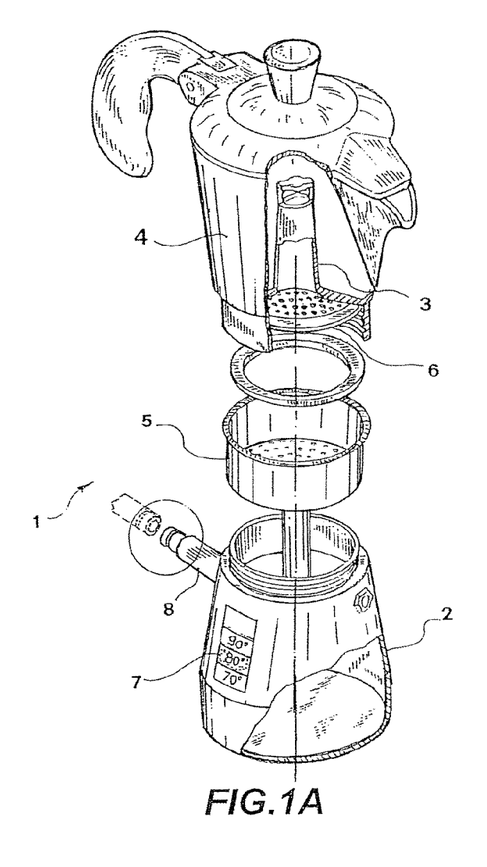
FIG. 1A is an exploded view of a first embodiment of a moka coffee machine according to the present invention.

Initially referring to FIG. 1A, it shows an exploded view of a first embodiment of a coffee machine according to the present invention.

More particularly, a moka coffee maker 1 consists of a boiler body 2 housing water to be heated on a burner or the like for preparing the coffee-flavoured drink.

Onto the boiler 2 it is screwed, or secured in another equivalent manner, a dispenser 3, optionally associated to a container 4 that will contain the drink once prepared.

Between the boiler 2 and the dispenser 3 it is interposed a first coffee-holding filter 5 holding the coffee powder for preparing the drink.

Preferably, a second filter 6 is placed above the first one, to prevent the coffee powder from ending up in the container along with the drink.

Figures 1A, 1B:
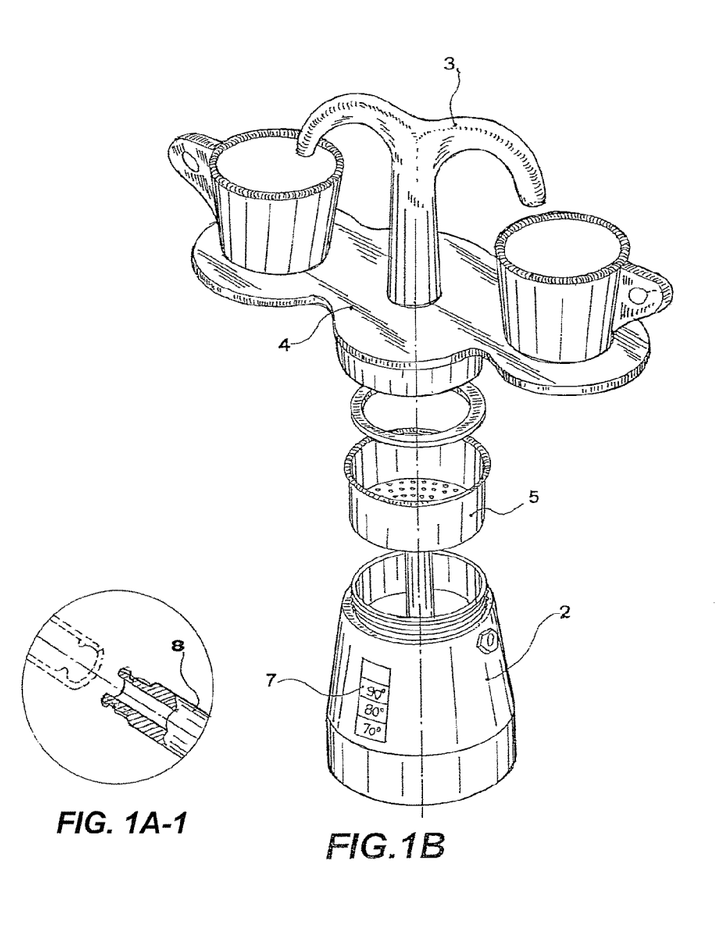
Figure 2:
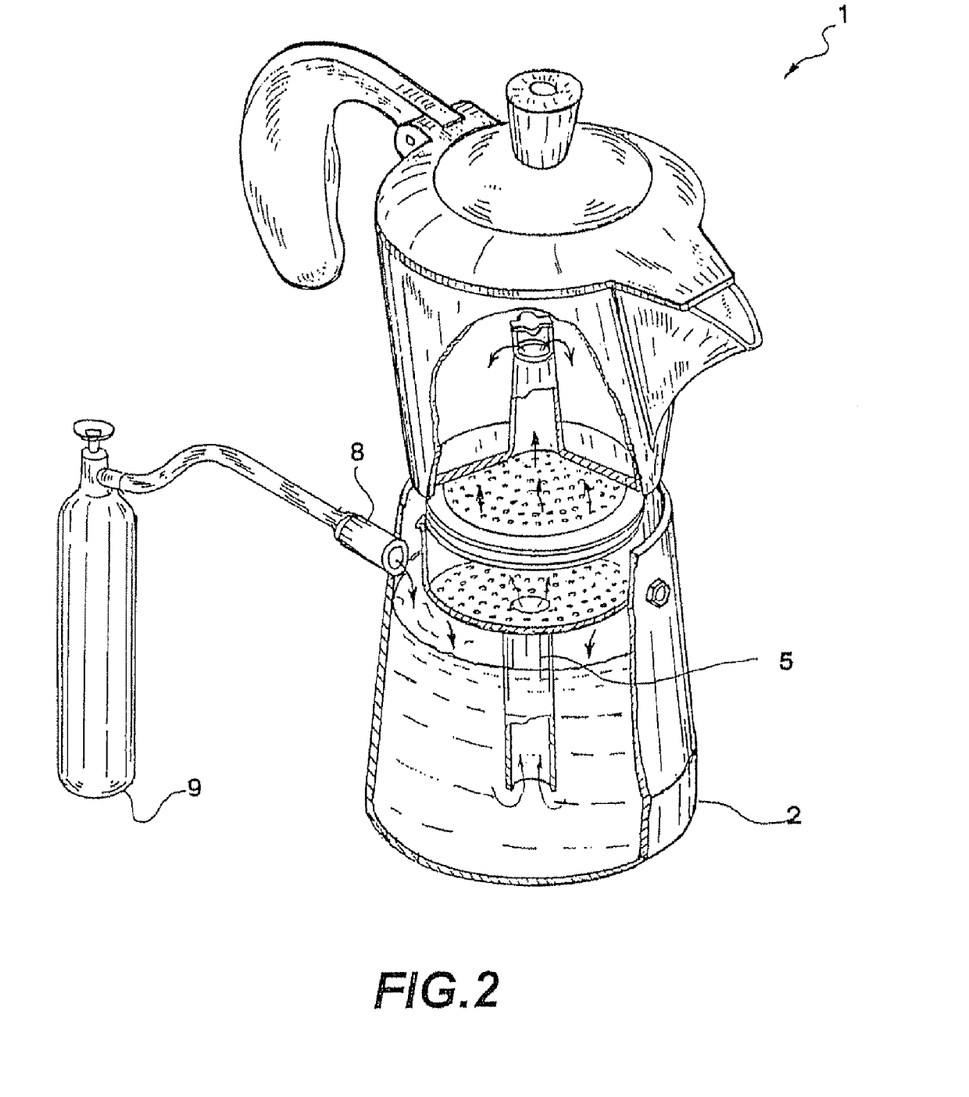
FIG. 2 is a section of the coffee maker of FIG. 1A.

According to a well-known alternative, illustrated in FIG. 1B, the container could be replaced by a support holding cups in which the dispenser, provided with a dispensing spout, directly delivers the prepared drink.

According to the present invention, the coffee maker 1 comprises means for controlling the temperature of the water inside the boiler 2.

In particular, according to such a first embodiment, such temperature controlling means 7 consists of a thermometer, secured on the boiler body, whose indication is visible from outside. According to an extremely simple variant embodiment, it can be implemented by means of a temperature-sensitive graduated strip 7, secured on the outside of the boiler body 2, e.g. of the kind in which different strip portions vary their coloration at a certain temperature. Of course, as it will be described hereinafter, different variant embodiments could be envisaged.

Thanks to the presence of this thermometer, the person preparing the coffee could monitor the temperature of the water in the boiler during the preparing of the drink. In particular, the temperature deemed optimal to the ends of the present invention is in the neighbourhood of 90° C.

Hence, when the thermometer signals the reaching of such a predetermined temperature the coffee maker could be removed from the heat source, or the latter could be turned off, in a manner such as not to further increase the temperature of the water in the boiler.

Moreover, on the boiler body 2 of the coffee maker according to the present invention, it is present means 8, 9 for inletting a gaseous-state fluid in the boiler.

E.g., such means could advantageously comprise a one-way valve 8 having an external connection to the boiler, preferably of a quick type (see FIGS. 1A-1), to which there could be connected a device 9 providing the gaseous fluid, e.g. an accumulation tank.

The fluid to be used should be an inert gas, in no way reacting with the water in the boiler and, of course, that may be provided in the gaseous state at the temperatures into play (80° C.-90° C.). In particular, it could be air, nitrogen, carbon dioxide, or other gas.

Advantageously, the tank providing the gas may be such as to accumulate a remarkable quantity thereof in compressed form, so as to constitute a useful reserve for preparing several coffees; e.g., it could be a compressed gas bottle 9.

Then, upon reaching the ideal temperature for preparing the drink, the bottle 9 is connected to the valve 8 via a feed duct. Then, a certain quantity of compressed gas is introduced into the boiler 2, causing a pressure increase therein that forces the heated water to rise into the container through the duct of the filter 5. Evidently, for a correct operation the pressure thus generated inside the boiler should be greater than the atmospheric pressure.

Thus, the temperature of the water coming into contact with the coffee is not so high as to spoil most of the organoleptic features of the coffee; therefore, the resulting drink will have, upon reaching the container 4, the appearance, the aroma and the taste of an excellent expresso coffee, very similar to that prepared with a professional machine for coffee bar use.

The first embodiment of the present invention described hereto is that representing more simply the inventive concept underlying the present invention and allowing the implementation thereof in the most simple and inexpensive manner.

Evidently, always within the scope of the same inventive principle, there could be envisaged some variant embodiments allowing an easier use of the coffee maker according to the present invention and requiring a lesser intervention by a person wishing to prepare the drink.

Figure 3:
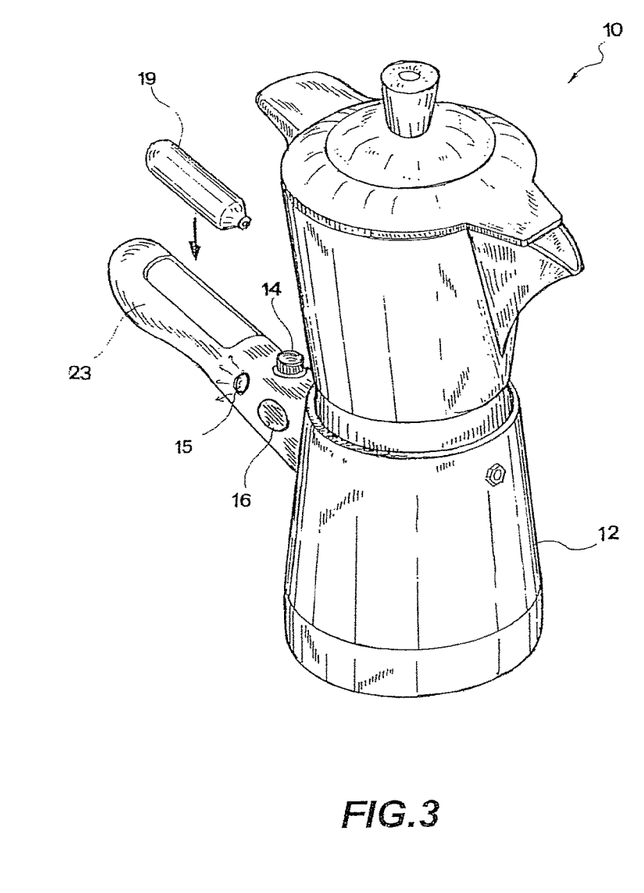
FIGS. 3 and 4 refer to a second embodiment of a moka coffee machine according to the present invention.
Figures 4, 4A:
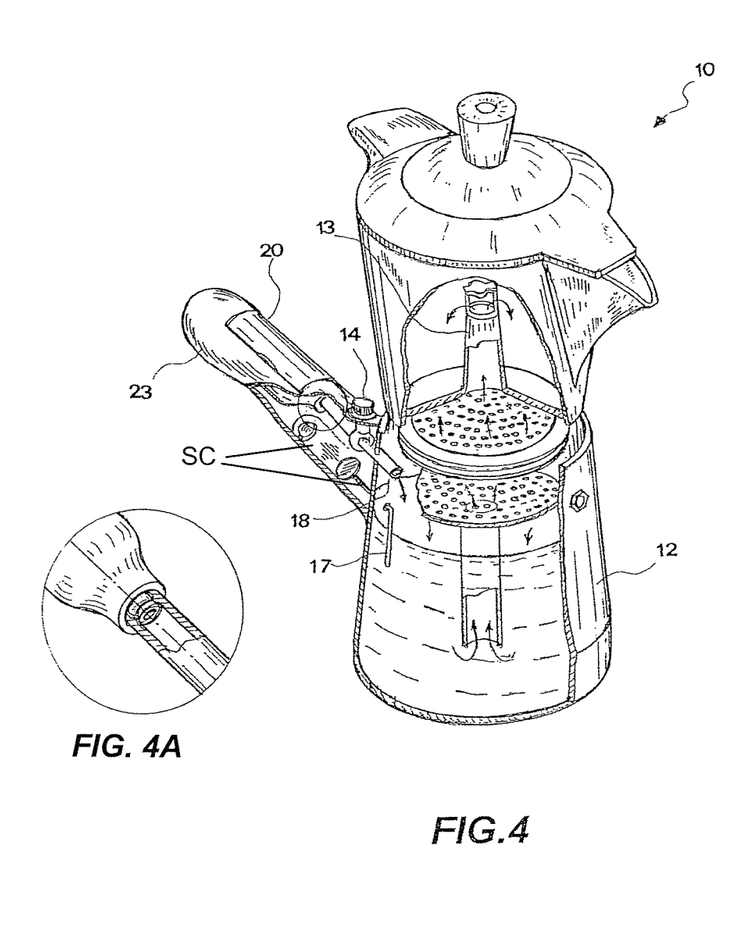
FIG. 4A is a detailed view of a quick connector.

Therefore, with reference to FIGS. 3 and 4, hereinafter it will be described a second embodiment of a coffee machine according to the present invention.

Such a second embodiment refers to a moka coffee maker 10, comprising a boiler body 12. To the boiler body 12 it is connected a handle 23. The handle 23, besides from carrying out the common function of handle for gripping the coffee maker, is configured in a manner such as to house the means 14, 18, 19 for inletting gas inside the boiler. In particular, it is provided a compressed air bottle 19, advantageously equipped with a quick connector (see FIG. 4A) so as to be removable and replaceable with extreme ease, through the opening 18, closeable by a lid 20.

Therefore, the bottle 19 is connected, via a duct internal to the handle 23, to a one-way valve opening it on the inside of the boiler 12.

In addition, it is provided means 7, 17 for controlling the temperature. More specifically, such means comprises, inside the boiler 12, a thermometer probe 17 detecting the temperature of the water. The probe is connectable to a signalling circuit SC, external to the boiler; when the temperature reaches a predetermined threshold, e.g. of 90° C., said circuit provides a signal via signalling devices such as a thermometer, a LED 15 and/or a buzzer 16.

Such a signal can also be used to enable the operation of activation means 14, e.g., an activation pushbutton allowing the operator to let gas flow inside the boiler.

Evidently, the number of times the coffee maker can operate without having to replace the compressed gas bottle 19 basically depends on the modes with which the gas itself is accumulated in the bottle. The greater the storage pressure, the greater the number of operation cycles of the bottle. Therefore, these parameters will depend also on the nature of the gas.

To the ends of the present invention, it is likewise important to be able to adjust the pressure reached inside the boiler. In fact, depending on the coffee powder used and above all on its grounding, such a pressure is decisive. In particular, the more finely ground the coffee powder is, the greater the pressure inside the boiler will be.

For this purpose, the coffee maker could advantageously be provided with a pressure and/or flow regulator, mounted onto the duct for inletting gas in the boiler, allowing to obtain the desired pressure value.

The regulator could also be of a presettable kind, optionally among a finite number of choices, so as to set the pressure value depending on the coffee used.

Figure 5:
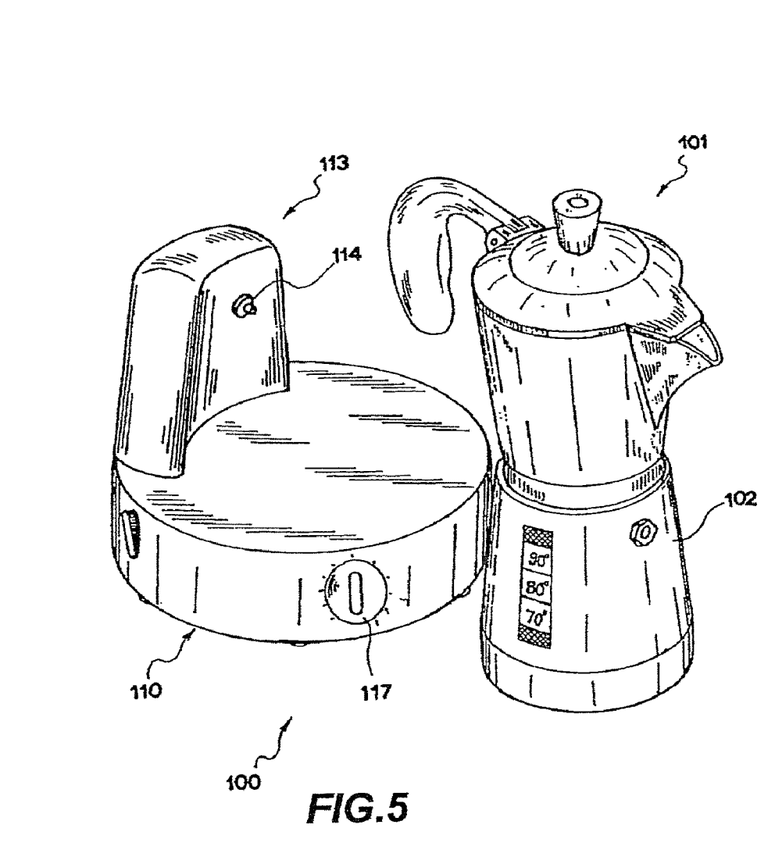
FIGS. 5 and 6 refer to a third embodiment of a moka coffee machine according to the present invention.
Figure 6:
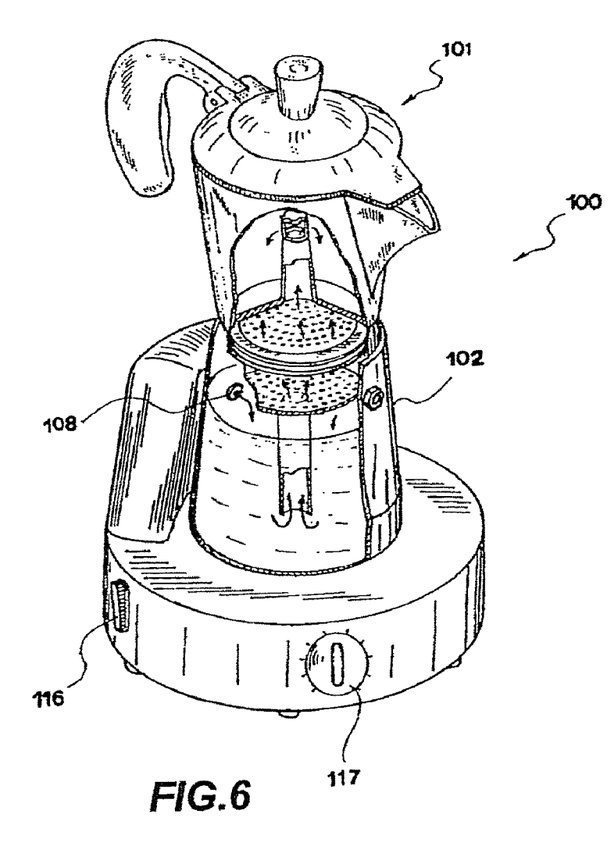

Next, FIGS. 5 and 6, refer to a third embodiment of a coffee machine according to the present invention.

According to such an embodiment of the invention, a coffee machine 100 comprises a coffee maker 101 comprising a boiler body 102 onto which it is mounted a one-way valve 108 for inletting a gas inside of the boiler itself.

Moreover, inside the boiler 102 it is advantageously installed a thermometer probe 107 for metering the water temperature during the operation of the coffee maker. Such a probe 107 will have the corresponding electric contacts connected to a connector located outside of the boiler body.

Alternatively, onto the boiler there could be provided different means for controlling the water temperature, like e.g., a thermometer visible from the outside of the boiler itself.

In addition, the coffee machine 100 comprises a base 110 onto which there may be housed the coffee maker 101.

Advantageously, the base 110 is equipped with a connecting region 113 provided with quick connectors 114, 115, respectively, for a duct carrying the gas to be introduced under pressure into the boiler and, optionally, for the electric contacts of the thermometer probe 107.

In order to prepare the coffee-flavoured drink, the coffee maker 101, upon having normally been loaded with water and coffee powder, can be placed on a burner, as usual.

When the water inside the boiler reaches the desired temperature, and this can be checked through the boiler thermometer or according to alternatives described hereto or equivalent ones, the operator could position the coffee maker 101 onto the base 110 in a manner such that the one-way valve 108 be connected to the connector 114. Advantageously, the base 110 could be shaped so as to allow a correct positioning of the coffee maker.

Then, the operating means could activate the gas flow to the inside of the boiler 102, by means of the connector 114.

Figure 9:
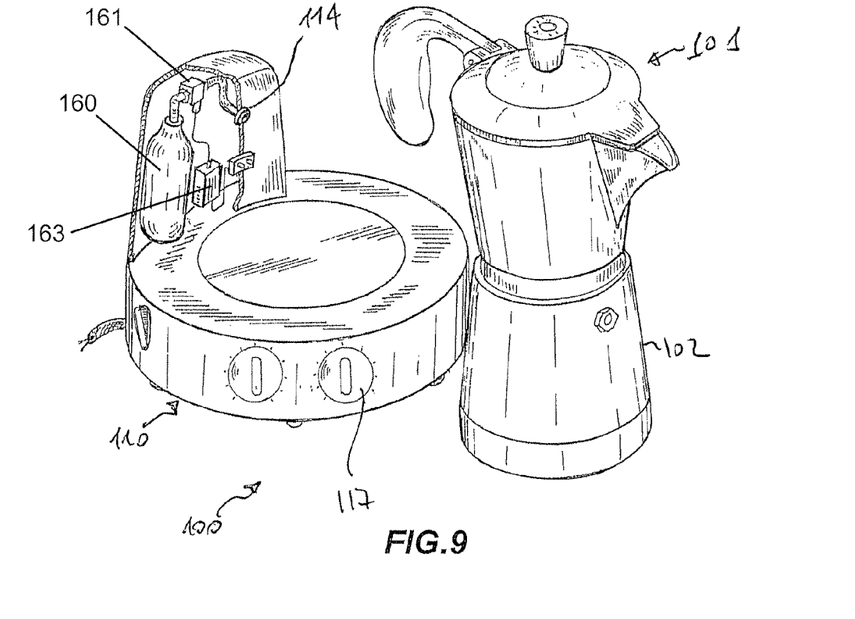
FIG. 9 shows an embodiment with a compressed gas tank.

In this case, the base 110 could comprise a compressed gas tank 160, as in the above-described embodiments, operated, e.g., by means of a solenoid valve 161. See FIG. 9.

Figure 10:
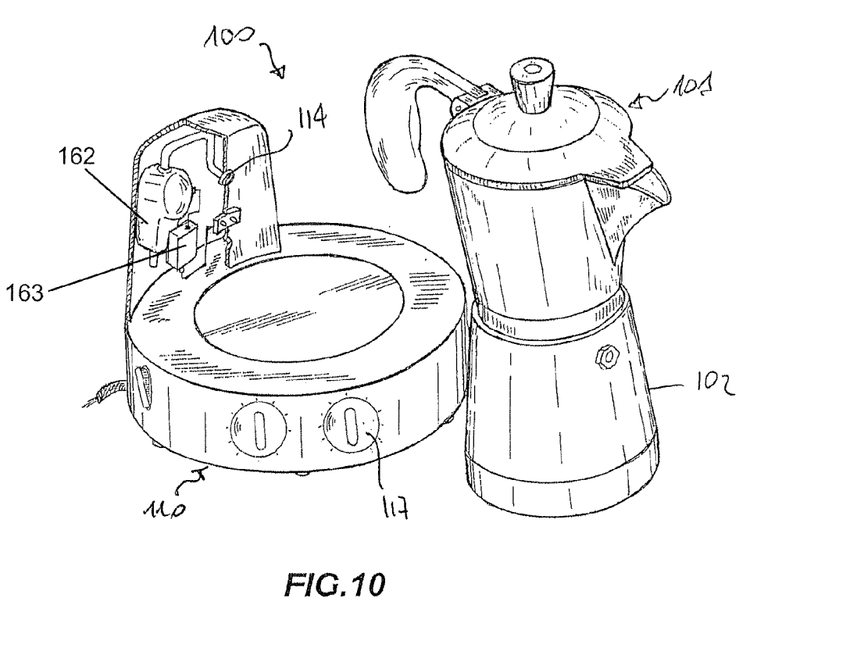
FIG. 10 shows an embodiment using a micro compressor.

Alternatively, the base 110 comprises an micro compressor 162 for air that, when operated, provides compressed air to be introduced in the boiler body. See FIG. 10.

Moreover, the base could provide a pressure and/or flow regulator, adjustable by means of an adjustable control device 118, in order to set various desired pressure values inside the boiler, depending on the different kinds of coffee used.

Figures 7, 8:
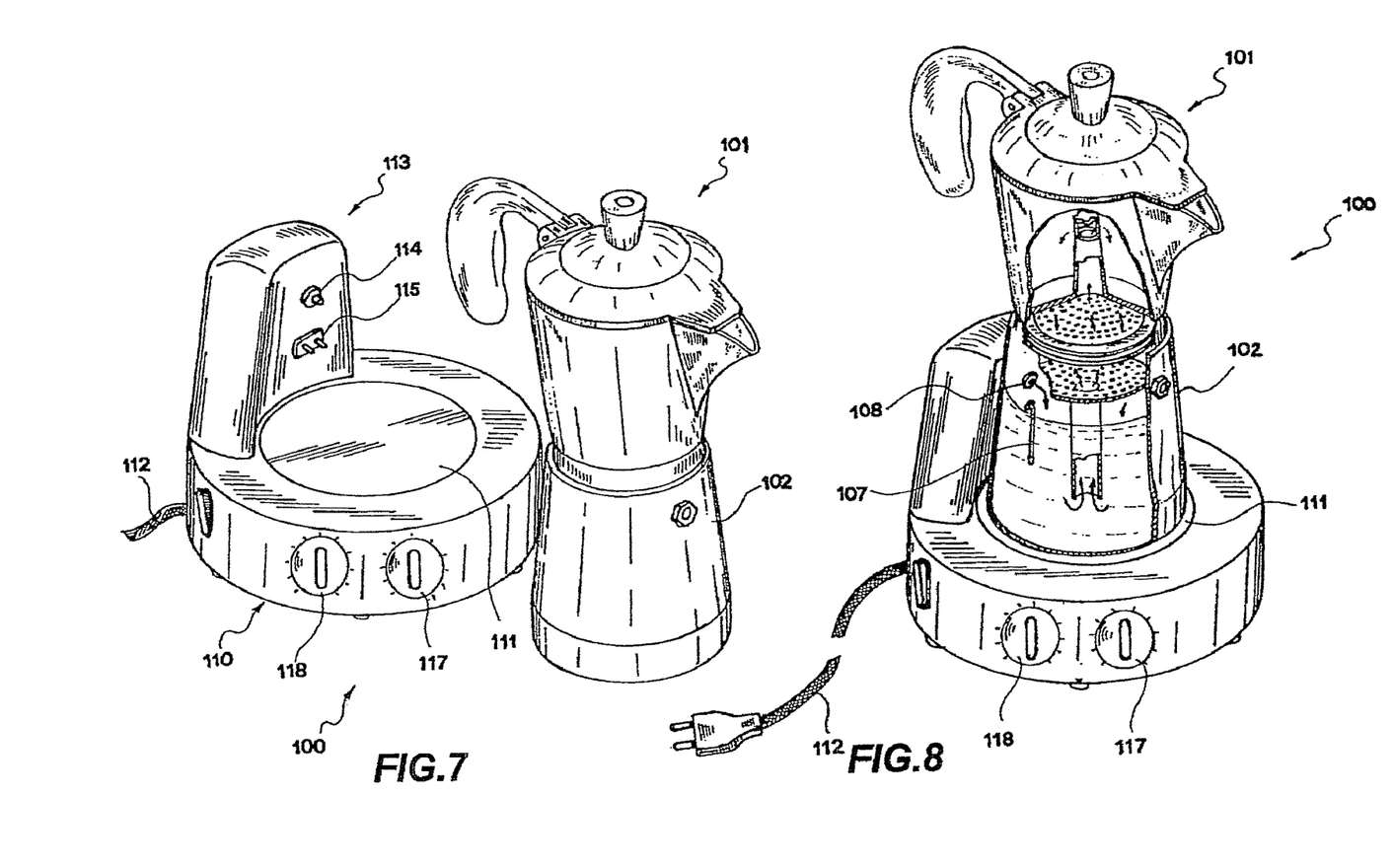
FIGS. 7 and 8 refer to a variant of the coffee machine of FIGS. 5 and 6.

Advantageously, according to a variant of such a third embodiment illustrated in FIGS. 6 and 7, the base 110 may further comprise a heat source 111, e.g. an electric cooker, powered through the network supply 112.

More particularly, in order to prepare the coffee-flavoured drink, the coffee maker 101, upon having normally been loaded with water and coffee powder, can be placed on the cooker 111 in a manner such as to connect the one-way valve 108 to the connector 114 and the thermometer probe to the electric connector 115. In order to ease such connections, the cooker 111 could be shaped in a manner such as to allow a correct positioning of the coffee maker.

According to this embodiment, upon turning on the coffee machine 100, e.g., via the switch 116, all the steps of the method for preparing the coffee-flavoured drink according to the present invention could be automatically performed by the machine itself.

In fact, it is provided the option of presetting the maximum temperature to be reached by the water for preparing coffee, e.g., of 90° C., via the adjusting of a thermostat 117.

The signal provided by the thermometer probe 107 is provided to operating means 163, e.g. an electric or electronic circuit, which will deactivate the heat source 111. See FIGS. 9 and 10.

Moreover, upon reaching said temperature, the operating means could activate the gas flow to the inside of the boiler 102, by means of the connector 114.

In this case, the base 110 could comprise a compressed gas tank, as in the above-described embodiments, operated, e.g., by means of a solenoid valve.

Alternatively, the base 110 comprises a micro compressor for air which, once operated, provides compressed air to be introduced in the boiler body.

Moreover, the base could provide a pressure and/or flow regulator, adjustable by means of an adjustable control device 118, in order to set different desired pressure values inside the boiler, depending on the different kinds of coffee used.

The present invention has hereto been described with reference to preferred embodiments thereof. Evidently, the three embodiments described hereto could be combined thereamong in a manner such as to originate other embodiments having different combinations of features, without however departing from the inventive kernel of the present invention.

In addition, it is understood that other embodiments afferent to the same inventive kernel may exist, all falling within the protective scope of the appended claims.

The invention claimed is:

1. A moka coffee machine comprising:
a boiler for heating water;
a dispenser for a prepared drink;
a coffee-holding filter interposed between said boiler and said dispenser, wherein the heated water rises to the dispenser through said filter;
means for controlling the temperature of the water inside the boiler, apt to provide a signal of reaching a predetermined temperature;
means for inletting a fluid in the gaseous state in said boiler, that can be activated at the reaching of said predetermined temperature, wherein said gaseous fluid introduced in the boiler causes a pressure increase therein, forcing the heated water to rise to the dispenser through said filter, wherein said inletting means comprises a one-way valve, mounted on said boiler, wherein said one-way valve has a quick connector for connecting a feed duct of said gaseous fluid, wherein said inletting means further comprises an accumulation tank of said gaseous fluid, connectable to said one-way valve via said feed duct, and wherein said accumulation tank is a compressed air bottle; and
a handle, connected to said boiler, said handle being configured in a manner such as to house therein said compressed air bottle.

2. The coffee machine according to claim 1, wherein said temperature controlling means comprises one or more indicators apt to signal the reaching of said predetermined temperature.

3. The coffee machine according to claim 2, wherein said indicators comprise a thermometer.

4. The coffee machine according to claim 3, wherein said thermometer is a temperature-sensitive graduated strip, applied externally to said boiler.

5. The coffee machine according to claim 1, wherein said temperature controlling means comprises a thermometer probe, mounted inside said boiler.

6. The coffee machine according to claim 5, wherein said thermometer probe is connectable to a signalling circuit external to said boiler.

7. The coffee machine according to claim 5, wherein said thermometer probe is calibrated in a manner such as to provide a signal at the reaching of said predetermined temperature.

8. The coffee machine according to claim 7, wherein said signal is of visual and/or acoustic type.

9. The coffee machine according to claim 8, comprising a LED for visually signalling the reaching of said predetermined temperature.

10. The coffee machine according to claim 8, comprising a buzzer for acoustically signalling the reaching of said predetermined temperature.

11. The coffee machine according to claim 7, wherein said signal enables the operation of activation means, said means being apt to allow a flow of the gaseous fluid to the boiler.

12. The coffee machine according to claim 11, wherein said activation means comprises an activation pushbutton.

13. The coffee machine according to claim 1, wherein said compressed air bottle is removably connected to said one-way valve through a quick connector.

14. A moka coffee machine comprising:
- a boiler for heating water;
- a dispenser for a prepared drink;
- a coffee-holding filter interposed between said boiler and said dispenser, wherein the heated water rises to the dispenser through said filter;
- means for controlling the temperature of the water inside the boiler, apt to provide a signal of reaching a predetermined temperature, wherein said temperature controlling means comprises a thermometer probe, mounted inside said boiler;
- means for inletting a fluid in the gaseous state in said boiler, that can be activated at the reaching of said predetermined temperature, wherein said gaseous fluid introduced in the boiler causes a pressure increase therein, forcing the heated water to rise to the dispenser through said filter; and
- a base apt to house a coffee maker and comprising a connecting region provided with quick connectors for connecting the one-way valve present onto the boiler of the coffee maker.

15. The coffee machine according to claim 14, further comprising a heat source.

16. The coffee machine according to claim 15, wherein said heat source is an electric cooker.

17. The coffee machine according to claim 15, further comprising an adjustable thermostat for setting a maximum temperature of the water inside the boiler.

18. The coffee machine according to claim 17, further comprising operating means apt to deactivate the heat source at the reaching of said maximum temperature.

19. The coffee machine according to claim 18, wherein said operating means are moreover apt to activate the gas flow to the inside of the boiler, by means of the connector.

20. The coffee machine according to claim 14, wherein said quick connectors comprise an electric contact for connecting the thermometer probe present onto the boiler of the coffee maker.

21. The coffee machine according to claim 14, wherein said base comprises a compressed air tank that can be operated by means of a solenoid valve.

22. The coffee machine according to claim 21, wherein the gas flow is activated by actuating said solenoid valve.

23. The coffee machine according to claim 14, wherein said base comprises an micro compressor for air apt to provide compressed air to be introduced in the boiler body.

24. The coffee machine according to claim 23, wherein the gas flow is activated by actuating said micro compressor.

25. The coffee machine according to claim 14, further comprising a control device for setting the desired pressure value inside the boiler, when the gas flow is activated.

* * * * *